3,107,151
PROCESS FOR THE REMOVAL OF SMALL AMOUNTS OF HYDROGENPEROXIDE FROM ORGANIC OPERATING SOLUTIONS
Ulrich Hauschild, Hannover, Germany, assignor to Kali-Chemie Aktiengesellschaft, Hannover, Germany, a firm
No Drawing. Filed Aug. 29, 1961, Ser. No. 134,574
Claims priority, application Germany Sept. 7, 1960
7 Claims. (Cl. 23—207)

It has been known to produce $H_2O_2$ by utilizing the autoxidation of certain organic compounds. For example, anthraquinone compounds can be catalytically hydrogenated to corresponding anthra-hydroquinones, which are subsequently oxidized by oxygen or an oxygen-containing gas, such as air, to quinones with the simultaneous formation of $H_2O_2$, whereupon the $H_2O_2$ which is dissolved in organic solvents is recovered, preferably by extraction with water. This process can be carried out in a cycle.

Numerous suggestions have been made for the selection of a suitable solvent in the above mentioned process. Frequently special mixtures of solvents are preferred, the components of which easily dissolve either the quinone form or the hydroquinone form only. For dissolving the quinone form, e.g. aromatic hydrocarbons, halogenated hydrocarbons, ketones and ether are used, while the hydroquinone is well soluble in alcohols. There are also some solvents which are capable of equally well dissolving the quinone form as well as the hydroquinone form, for example certain esters of mono- or dicarboxylic acids. However, as after the oxidation step the $H_2O_2$ formed is usually extracted with water, all solvents used in the above mentioned procedure must meet the condition of having no, or only very little solubility in water.

Hydrogenation of the quinone is carried out in the presence of a known metal-hydrogenation catalyst.

Palladium applied to a carrier material, such as aluminum oxide, magnesium oxide, calcium carbonate, calcium phosphate, or Raney nickel are generally used. These catalysts possess prior to their introduction into the hydrogenating device a definite activity which can be tested according to known methods.

In the course of a continuous process the activity of the hydrogenating catalyst decreases more or less, so that fresh catalyst has to be added continuously. The loss of activity is due primarily to the presence of quite specific catalyst poisons. If these catalyst poisons cannot be completely or almost completely eliminated, considerable expenses for the catalyst may occur.

It has been known that $H_2O_2$ is a strong catalyst poison for Raney nickel already at very low concentrations. It is, therefore, desirable to exclude the presence of this catalyst poison when a Raney nickel hydrogenation catalyst is used. It is known that in the cyclic process after the oxydation step the operating solution is extracted with water in order to remove all $H_2O_2$ as far as possible. However, due to the distribution equilibrium between organic and aqueous phase, it is not possible to extract the last parts of $H_2O_2$, and by the latter a continuous decrease of activity of the Raney nickel is caused.

For this reason various suggestions have been already made to remove the $H_2O_2$ which is still present in small quantities in the operating solution, prior to the hydrogenation step. It has been known, for example, that $H_2O_2$ can be catalytically decomposed by various heavy metals, such as iron, nickel, copper, or noble metals such as platinum or palladium. The corresponding metal oxides and hydroxides act also in a similar manner. The essential drawback of this treatment consists in that the liberated oxygen can react with hydroquinone still present in the solution with renewed formation of $H_2O_2$.

Treatment with solid substances or substances dissolved in water, which are capable of binding $H_2O_2$, such as sodium hydroxide, sodium metaborate or sodium carbonate has likewise been known. However, the efficiency of this treatment—which is often accompanied by a chemical change of the cycled organic solution—is very low, because considerable parts of $H_2O_2$ still remain in the organic solution.

It has also been suggested to treat the organic solution with mangano- and ferro-compounds, e.g. with a solution of $FeSO_4$ or with alcoholic solutions or suspensions which contain $Fe(OH)_2$. Thereby oxygen which is eventually dissolved in the solution, is also supposed to be removed, because these compounds are easily oxidized particularly in alkaline solution. However, apart from the consumption of chemicals, this suggestion is also not satisfactory, because it can relatively easily happen that iron or manganese enter the organic solution, so that decompositions occur in the oxidation step.

It has now been found, that the above described disadvantages can be avoided and a total removal of $H_2O_2$ which remains in the operating solution of the anthraquinone process can be attained prior to the hydrogenating step by treating the organic solution with an aqueous solution of a stannous salt. It is surprising that stannous salt solutions remain practically indifferent to the anthraquinone solutions during the short period of time which is necessary for the extraction and react with the $H_2O_2$ only. Operation at ordinary room temperature is preferred. In carrying out the invention it is further preferred to use the stannous chloride, although other water-soluble stannous salts, e.g. the sulfate or fluoride can be also used.

Concentration of the stannous salts in the aqueous phase may have any desired value. It depends primarily on the amount of $H_2O_2$ still present in the organic solution, because in order to completely remove the $H_2O_2$ always an excess of the respective stannous salt must be, of course, available. As a rule, solutions containing 1–5% of the stannous salts are used.

By the addition of a small amount of a mineral acid, precipitation of oxy compounds, or hydroxide or oxide can be prevented, in order to avoid disturbances during the fluid-fluid extraction. Moreover, adjustment of the aqueous phase to a low pH has a rather favorable influence on the separation of the organic and aqueous phase after extraction, so that an undesired formation of emulsions is avoided.

A particular advantage of using stannous salt solutions for the removal of small amounts of $H_2O_2$ from the organic solutions of the anthraquinone process consists in the possibility of easy regeneration of the stannic salt solutions formed. For example, a $SnCl_4$ solution can be electrolytically reduced to a $SnCl_2$ solution in conventional manner. An aqueous $SnCl_2$ solution can be used, therefore, in a cycle permanently, by bring it first in contact with the organic solution in order to remove residual amounts of $H_2O_2$, then separating it and finally subjecting it to treatment in an electrolytic device for reducing the stannic formed. It will be understood that the Sn salt solution can be regenerated also by other reducing agents.

The operating solutions which are used in the production of $H_2O_2$ according to the anthraquinone process, contain prior to their entering the hydrogenating apparatus still parts of hydrogenated anthraquinone compounds. Because these compounds are capable of reacting with oxygen with the formation of the corresponding quinone compounds and $H_2O_2$, it is advisable to exclude the access of oxygen during and after the treatment with the stannous compounds by the use of an inert gas atmosphere, preferably nitrogen. Furthermore, the solution can be rinsed with nitrogen prior to the treatment in order to remove oxygen dissolved in the solution.

The following examples describe some specific embodiments of and best modes for carrying out the invention, to which the invention is not limited.

*Example 1*

A solution of 60 grams of ethylanthraquinone in 500 ml. of benzol and 500 ml. of octanol was stirred at 40 to 50° C. with hydrogen in the presence of Raney nickel until about half of the amount of ethylanthraquinone which could be theoretically expected, was formed. After separation of the catalyst the solution was completely oxidized by blowing in air and 4 grams of $H_2O_2$ were thereby formed. Subsequently extraction was carried out five times with 50 ml. of water in each case.

After this treatment, the organic solution still contained 25 mg. of $H_2O_2$. In order to remove air dissolved, nitrogen was introduced into the solution by means of a glass frit. The solution was now extracted with 50 ml. of an aqueous $SnCl_2$ solution which contained 3 grams of $SnCl_2$ in 100 ml. and to which a few drops hydrochloric acid were added previously. After the two phases were separated, no $H_2O_2$ could be found any more in the organic solution.

*Example 2*

1 liter of an industrial operating solution of the anthraquinone process for producing $H_2O_2$, which contained prior to the hydrogenation step in addition to a small amount of hydroquinone 15 mg. of $H_2O_2$, was mixed with 80 ml. of a 5% $SnCl_2$ solution which was acidified with hydrochloric acid, and the resulting product was vigorously mixed in a separatory funnel. After separation of the two phases which took place relatively quickly, no $H_2O_2$ could be found in the operating solution. Furthermore, no Sn could be detected in the organic solution.

*Example 3*

To 250 ml. of an industrial operating solution of the anthraquinone process for producing $H_2O_2$, 25 ml. of a 1% aqueous solution of $SnSO_4$, which was acidified with a small amount of sulfuric acid, was added. After vigorous shaking in a separating funnel and separation of the two phases, the $H_2O_2$ content of the organic solution was determined. While the starting solution saturated with air contained 5.6 mg. of $H_2O_2$, after treatment with the $SnSO_4$ solution, the organic solution contained 0.3 mg. of $H_2O_2$ only.

*Example 4*

A 6% solution of 2-ethylanthraquinone in a mixture of 500 ml. of di-iso-butylcarbinol contained 2.8 mg. of $H_2O_2$ per liter solution. 250 ml. of this solution was vigorously mixed in a separating funnel with 25 ml. of a 2% aqueous $SnF_2$ solution, to which a very small amount of HF was added. After separation of the two phases no $H_2O_2$ could be found in the clear organic solution.

The parts and percent mentioned herein are by weight if not otherwise stated.

The treatment with stannous-salt solutions according to the invention is preferably carried out at room temperature, e.g. 15–25° C., but somewhat higher or lower temperatures in the range of 0 to 45° C. can also be used. The pH of the stannous-salt solutions should be in the range of 0.1 to 4.5, preferably in the range of 1.0 to 3.0. The stannous-salt solution should contain the stannous-salt in an excess over the amount necessary for reacting with the $H_2O_2$ to be removed from the organic solution.

Instead of the stannous salts specifically mentioned above, other stannous salts can be used in the same manner.

What is claimed is:

1. A process for the removal of small amounts of $H_2O_2$ from an organic solution used in circulation, in which hydrogen peroxide is formed by hydrogenation of an anthraquinone to the anthrahydroquinone and subsequent recovery of the anthraquinone by oxidation with oxygen with simultaneous formation of $H_2O_2$, the bulk of which is recovered from the oxidized solution by extraction with water, comprising removing said small amounts of $H_2O_2$ from said organic solution by mixing the organic solution at ordinary room temperature with an aqueous solution of a stannous salt said solution being acidified and subsequently separating the aqueous solution from the organic solution.

2. A process according to claim 1, in which the stannous salt is selected from the group consisting of $SnCl_2$, $SnSO_4$ and $SnF_2$.

3. A process as claimed in claim 1, in which the aqueous solution of the stannous salt has an acid pH in the range of 0.1–4.5.

4. A process as claimed in claim 1, in which the acid pH is brought about by the addition of a mineral acid selected from the group consisting of HCl, HF and $H_2SO_4$.

5. A process claimed in claim 1, in which the process is carried out in an inert gaseous atmosphere.

6. A process as claimed in claim 5, in which the inert gas is nitrogen.

7. A process as claimed in claim 1, in which the aqueous solution of the tin salt is regenerated after use and used in a cycle.

References Cited in the file of this patent

UNITED STATES PATENTS

| | | |
|---|---|---|
| 1,986,672 | Bergman | Jan. 1, 1935 |
| 2,091,178 | Gilbert et al. | Aug. 24, 1937 |
| 2,369,912 | Pfleiderer et al. | Feb. 10, 1945 |